United States Patent Office 2,715,031
Patented Aug. 9, 1955

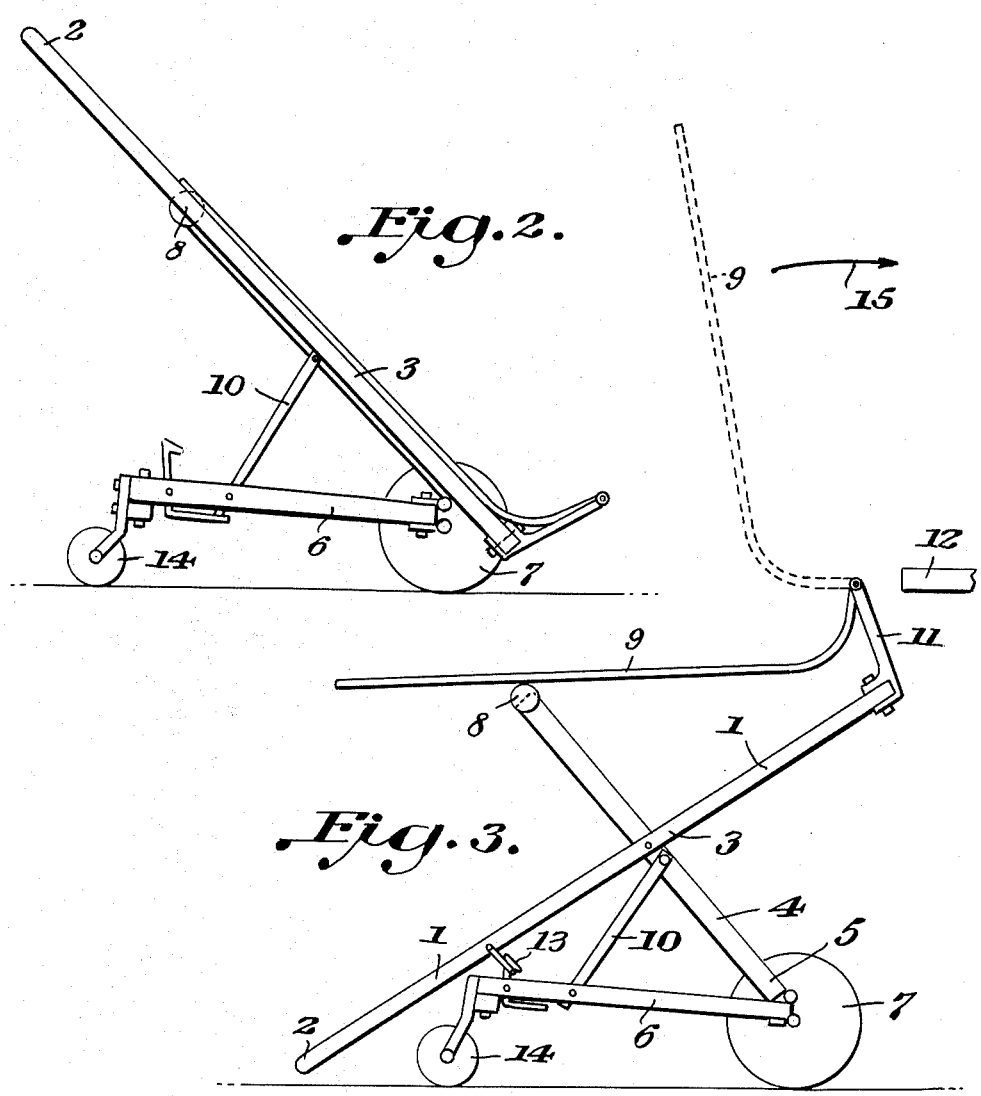

2,715,031

MAGAZINE BARROW

Elis Evert Danielsson, Mariehamn, Finland

Application October 14, 1952, Serial No. 314,713

Claims priority, application Finland October 26, 1951

1 Claim. (Cl. 280—36)

The transport of sacks, barrels etc. in magazines is generally performed by simple two wheeled barrows. The disadvantage of these commonly known barrows is their lack of suitable arrangements for effecting an elevation of the cargo from the barrow up to a higher level, such as a truck's platform. Different arrangements are proposed for the effecting of such elevation operations but none of them has proved satisfactory. One known proposed construction comprises for instance a separate platform for the cargo which is arranged to be moved along the shafts of the barrow by the aid of a pulling wire connected to the platform and wound around a roller device. Cogwheels or gear arrangements are also proposed for effecting the vertical elevation of the barrow's cargo but all these constructions are also slow, inconvenient and expensive to produce.

The present invention relates to a magazine barrow with a device which eliminates the said disadvantages. It is adaptable for magazine barrows which have two longitudinal shafts with handles at their one end and combined with barrow wheels on the other end and being mutually connected by transversal beams. The main feature of the invention is that said longitudinal shafts substantially at their middle part are pivotally hinged at the middle part of a frame, said frame being at its one end pivotally combined with a car chassis on which the car wheels are mounted, the connection of the shafts and the frame being arranged as to permit movement of the parts relative each other like the parts of scissors in such a way, that if the barrow shafts at their handle ends are lifted the frame and the shafts will switch together to lie practically in the same level, but if the shafts' handle ends are pressed down and the frame by suitable support means prevented to follow the downward movement of the shafts the frame and the shaft will spread apart from one another crosswise.

A further feature is that the end of the barrow shafts, opposite to the handles is pivotally connected to a special separate platform for the barrow's cargo, which platform at its other end rests on rollers mounted in the upper end of said frame in such a way that when the handle ends of the shafts are lifted the cargo platform will take a position substantially in line with or parallel to the level of the frame and the barrow shafts but when the shaft handles are pressed down the platform will be elevated carried by the shaft ends and the roller end of the frame to a higher level substantially parallel to the ground on which the barrow rests.

Still another feature of the barrow is that the cargo may be unloaded from the barrow by lifting the free end of the cargo platform in such a way that this platform turns around its bearing point at the ends of the barrow shafts. If the cargo platform earlier is elevated the cargo may be unloaded onto a higher level.

The invention will be described more in detail in connection with the enclosed drawing, which diagrammatically shows one embodiment of the barrow construction.

Fig. 1 shows the magazine barrow, the different parts of which being pivoted together, i. e. the cargo platform, the shafts and the frame lying all together practically in the same level.

Fig. 2 is a side view of the barrow in which its different movable parts are lifted to a sloping position but still lying all together practically in the same level. In this position the cargo of the barrow generally is transported along the floor in the magazine.

Fig. 3 shows the barrow in a position, in which the shafts' handles end is pressed down, whereby the shafts and the frame have parted scissors-like and the cargo platform is elevated to a position from which the cargo conveniently may be unloaded by turning the platform around its bearing point at the ends of the barrow shafts in order to move the cargo over to an elevated level such as a truck's platform.

In the different figures the barrow's shafts are indicated by 1 and the shafts' handles by 2. The middle parts of the shafts are designated 3 and here the shafts are hinged at the middle parts of a frame 4. One end of the frame is indicated by 5 and is pivotally connected to the chassis of the barrow which has two wheels 7. The other end of the frame 4 is fitted with rollers 8. The barrow has further a special platform 9 for the cargo, which platform is pivotally hinged in a support element at the end of the shafts opposite to the shaft handles. The frame 4 has special support beams 10 which may become connected to the chassis 6 if one wishes to prevent the frame 4 from pivoting down to the level of the chassis frame when the barrow shafts and the frame are lifted to a sloping position against the floor.

If the shafts 1 are lifted at the handle ends from the position shown in Fig. 1 the barrow parts arrive all together until the position according to Fig. 2. If in this position the support beams 10 are fastened in the chassis frame 6 and the shaft handles 2 thereafter pressed down against the ground the frame 4 will be prevented from following the movement of shafts 1. The shafts 1 and the frame 4 will hereby part from one another turning crosswise about their mutual connecting points at their middle parts like the parts of scissors. Simultaneously herewith the platform 9 for the barrow cargo will be elevated to the position as shown in Fig. 3. In this position the shafts 1 are locked in their turned position by means of a special locking device 13. Hereafter the cargo platform 9 may be turned around its bearing point at the ends of the shafts 1 as is shown by dotted lines in Fig. 3, whereby the cargo carried by the platform 9 becomes unloaded on a higher level such as a truck's platform or the like 12.

The chassis has further a third supporting wheel 14 at its rear end, but this wheel is not essential to the construction. It may also be favorable to arrange locking means for instance pivoted links between the shafts and the frame in order to make it possible to keep them separated from each other in different positions.

The shown and explained barrow device consequently makes convenient transport possible along the floor in a magazine as well as from a lower level up to an elevated level.

Having now particularly described and ascertained the nature of the said invention and in what manner the same has to be performed I declare that what I claim is:

Magazine barrow comprising two longitudinal shafts with handles, a frame, said shafts being pivotally connected substantially at their centers at substantially the middle part of said frame, a chassis having two wheels, said frame being connected pivotally at one end to said chassis, supporting elements between said frame and chassis whereby said shafts and said frame are arranged so that if said shafts are lifted by their handle ends said shafts and said frame will be turned together upwardly around the pivot point of said frame in said chassis and lie substantially in line with one another but when the shafts' handle ends are pressed downwardly from the last mentioned position, while said frame is prevented from following said downward turning movement by said supporting elements said frame and shafts will spread apart, a platform for the cargo, said platform being hinged pivotally at the end of said shafts opposite said handles and resting on said frame at that end which is opposite to its pivotal connection point in said chassis, said cargo platform being adapted to take a position parallel to and substantially level with said shafts and said frame when they are pivoted together but being raised to a level higher than and substantially parallel to the plane of said chassis when said shafts and frame are spread apart from each other.

References Cited in the file of this patent

UNITED STATES PATENTS

| | | |
|---|---|---|
| 915,721 | Aldous | Mar. 23, 1909 |
| 1,203,194 | Haege | Oct. 31, 1916 |
| 1,452,449 | Thouviot | Apr. 17, 1923 |
| 1,887,134 | Johancen et al. | Nov. 8, 1932 |

FOREIGN PATENTS

| | | |
|---|---|---|
| 638,432 | France | Feb. 21, 1928 |